United States Patent [19]
Anderson

[11] Patent Number: 5,911,077
[45] Date of Patent: Jun. 8, 1999

[54] SYSTEM FOR MULTITHREADED DISK DRIVE OPERATION IN A COMPUTER SYSTEM

[75] Inventor: Eric D. Anderson, Village of North Hudson, Wis.

[73] Assignee: Micron Electronics, Inc., Nampa, Id.

[21] Appl. No.: 08/769,424

[22] Filed: Dec. 19, 1996

Related U.S. Application Data

[63] Continuation-in-part of application No. 08/657,601, May 31, 1996.

[51] Int. Cl.⁶ ........................................................... G06F 13/00
[52] U.S. Cl. ........................... 395/741; 395/670; 395/841
[58] Field of Search ........................... 395/733, 822–826, 395/736, 309, 182.13, 670, 741, 841

[56] References Cited

U.S. PATENT DOCUMENTS

| | | | |
|---|---|---|---|
| 4,888,691 | 12/1989 | George et al. | 395/182.13 |
| 5,058,004 | 10/1991 | Ravid | 364/200 |
| 5,131,089 | 7/1992 | Cole | 395/500 |
| 5,142,627 | 8/1992 | Elliot et al. | 395/275 |
| 5,237,466 | 8/1993 | Glaser et al. | 300/73.03 |
| 5,239,445 | 8/1993 | Parks et al. | 361/729 |
| 5,379,389 | 1/1995 | Whisler | 395/375 |
| 5,421,014 | 5/1995 | Bucher | 395/650 |
| 5,430,855 | 7/1995 | Walsh et al. | 395/275 |
| 5,459,872 | 10/1995 | Connell et al. | 395/736 |
| 5,521,929 | 5/1996 | Weng et al. | 371/40.1 |
| 5,581,715 | 12/1996 | Verinsky et al. | 395/309 |
| 5,642,516 | 6/1997 | Hedayat et al. | 395/733 |
| 5,694,604 | 12/1997 | Reiffin | 395/677 |
| 5,701,513 | 12/1997 | Kaneko | 395/826 |
| 5,724,539 | 3/1998 | Riggle et al. | 395/427 |
| 5,754,759 | 5/1998 | Clarke et al. | 395/183.13 |
| 5,790,870 | 8/1998 | Hausauer et al. | 395/733 |
| 5,819,112 | 10/1998 | Kusters | 395/856 |

*Primary Examiner*—Ayaz R. Sheikh
*Assistant Examiner*—Xuan M. Thai
*Attorney, Agent, or Firm*—Seed and Berry LLP

[57] ABSTRACT

The present invention uses multithreaded interrupt processing to permit simultaneous activation of multiple disk drives in a computer system. A data transfer request from an application software program includes a disk data transfer command identifying the disk drive designated to receive the command and an identification data element indicating the application software process associated with the disk data transfer command. A device driver processing multiple disk transfer commands analyzes the data transfer command and identification data element to identify independent disk data transfer requests. If no independent data transfer requests are identified, the device drive sequentially processes disk data transfer commands. However, if the device driver identifies independent disk data transfer commands, the device driver can process commands out of sequence so that the two independent disk data transfer commands may be simultaneously processed. In this manner, multiple disk drives can be active simultaneously.

2 Claims, 6 Drawing Sheets

SYSTEM FOR MULTITHREADED DISK DRIVE OPERATION IN A COMPUTER SYSTEM

CROSS-REFERENCE TO RELATED APPLICATION

This application is a continuation-in-part of U.S. application Ser. No. 08/657,601, filed on May 31, 1996.

TECHNICAL FIELD

The present invention relates generally to interrupt processing, and more particularly, to a system for multi-threaded disk drive operation with two or more disk drives in a computer.

BACKGROUND OF THE INVENTION

The use of computers, especially personal computers (PCs) is widespread. The computing power of the PC, whether coupled to a network or operating as a stand-alone device, has increased significantly as new computer designs move into production. Central processing units have become faster and more complex with each new generation of PC. Memory chips have also increased in both capacity and speed. Other elements, such as disk drives and compact disk read-only memory drives are common on PCs.

While the speed of central processing units and memories have increased, there are limitations to the speed at which a disk drive can transfer data. That is, reading data from the disk drive, or writing data to the disk drive is slow relative to the processing speed of the central processing unit and memory. Before data can be transferred to or from the disk drive, the central processing unit must send commands to the disk drive and wait for the disk drive to locate the appropriate physical position on the storage media at which to read data or write data. The disk drive generates an interrupt when it is ready for the data transfer. The interrupt must be processed by the central processing unit to actually transfer data. In a computer system with multiple disk drives, only one disk drive can be active at a time. In other words, only one disk drive can be actively locating the appropriate location on the storage media and generating interrupts. Therefore, it can be appreciated that there is a significant need for a system that will allow software programs to access multiple disk drives for independent disk-related operations. The present invention provides this and other advantages as will be apparent from the following detailed description and accompanying figures.

SUMMARY OF THE INVENTION

The present invention is embodied in a system for the simultaneous operation of multiple disk drives in a computer executing an operating system program. The system includes first and second disk drives responsive to disk commands and an identification data element indicating a source software program and disk drive associated with each of the disk commands. A software control module controls operation of the first and second disk drives. The software control module uses the identification data element to activate the first and second disk drives simultaneously if the identification data element indicates that a first disk command is associated with the first disk drive and a second disk command is associated the second disk drive.

In one embodiment, the computer is executing first and second software application programs and transferring data between the first and second software application programs and the first and second disk drives, respectively. In this embodiment, the identification data element indicates the first software application program as the source software program associated with data transfers between the first disk drive and the first software application program. The identification data element indicates the second software application program as the source software program associated with data transfers between the second disk drive and the second software application program.

In another embodiment, the computer is executing a single software application program and transfers data between the software application program and both the first and second disk drives. In this embodiment, the identification data element associated with both the first and second disk commands indicates the software application program as the source software program.

The system is capable of operating with an operating system that generates a plurality of data packets to control a corresponding plurality of data transfers between the source software program and the disk drives. Each of the plurality of data packets contains a disk command and identification data element. The software control module may execute the plurality of data packets sequentially, or in a nonsequential manner if nonsequential data packets correspond to the first and second disk drives, respectively. This allows the software control module to maximize the utilization of the first and second disk drives.

DETAILED DESCRIPTION OF THE INVENTION

Figure 1:
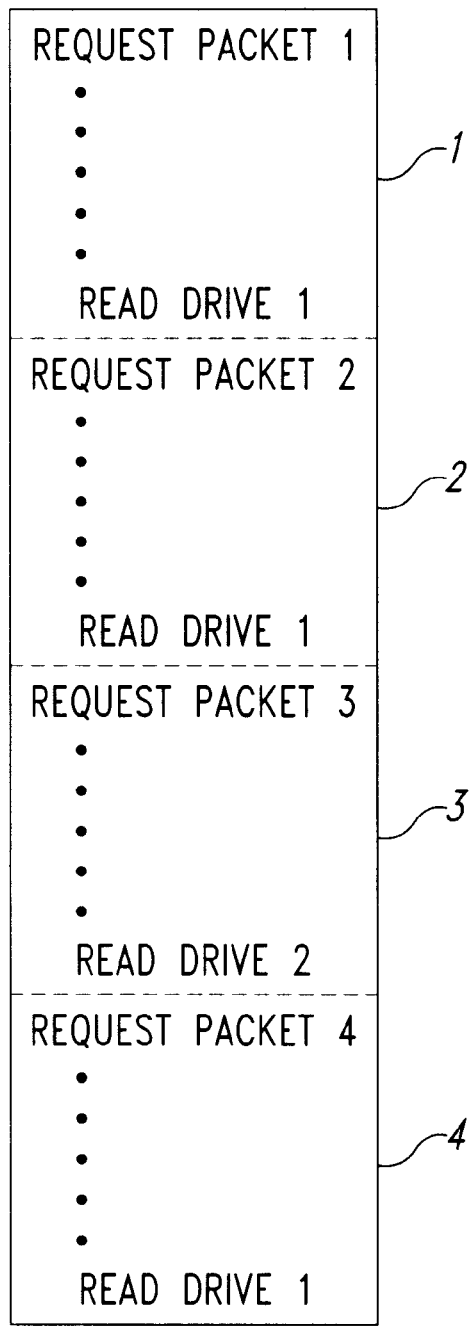
FIG. 1 is a schematic drawing which illustrates disk request processing by conventional computer systems.

A typical computer contains a single disk drive. While processing speeds and memory access times have been reduced by improvements to integrated circuit technology, disk access time is still relatively slow. Disk access time is defined as the time from which a command is issued to the disk drive to the time at which the disk drive actually completes the requested task. For example, if the user wishes to read a data file from the hard disk drive, the computer issues a disk read command along with data informing the disk drive of the physical location of the file on the disk. The disk drive must position the read/write head (not shown) at the proper physical location on the disk surface before any data can be read. Thus, there is a significant delay between the time that a command is issued to the disk drive and the time that the disk drive actually carries out that command. Similar delays occur when writing data to the disk drive.

The process of transferring data to or from the hard disk is performed by the operating system, such as Microsoft MS-DOS® or Windows® 95. Operations that are carried out by the operating system are sometimes referred to as processes or threads. Operating systems such as MS-DOS® only operate on a single thread or process at a time. Other operating systems, such as Windows® 95, are multitasking and can process multiple threads. For example, the operating system may read data entered by the user on a keyboard (not shown) while also maintaining an accurate time on a real-time clock (not shown). As those skilled in the art readily understand, multitasking operating systems are in reality executing only a single process at a time. However, such operating systems are capable of regulating several independent processes with the central processing unit executing instructions for each process in a form of time-division multiplexing. Thus, it appears to the user that several independent processes are executing simultaneously. However, the conventional operating system is incapable of multi-threaded disk drive processing. That is, only a single disk drive can be active at one time. A flag register (not shown), which is typically one byte in length, contains status information, such as an interrupt status, from the active disk drive.

Even if the prior art computer contains two disk drives, only one disk drive can be active at one time. Thus, the disk drive operations are referred to as single-threaded processes. If the computer is reading a data file from one disk drive, it issues a read command to that disk drive. When the read/write head for that disk drive is at the appropriate physical location, the disk drive fills an internal buffer with data and generates an interrupt. The interrupt handler software routine sets data bits in the flag register to predetermined values to indicate the presence of an interrupt. The computer inherently knows which disk drive generated the interrupt because only one disk drive is active at a time. Thus, the presence of two disk drives provides increased storage capacity, but does nothing to enhance system performance.

Multitasking operating systems, such as Windows® 95, perform disk processing by assembling request packets that are passed to a device driver. As is known in the art, device drivers are software routines that accept high level commands, such as disk related commands from the operating system, and convert these commands into a sequence of events that actually controls the transfer of data to and from the disk drive. FIG. 1 illustrates a series of request packets used in the conventional operating system. A first request packet 1 illustrates a request by a first software application program to read data from a first disk drive (not shown). A second request packet 2 is an additional request from the first application software program to read data from the first disk drive. A third request packet 3 is a request from a second software application program to read data from a second disk drive (not shown). A fourth request packet 4 is a request from the first application software program to read data from the first disk drive. A conventional computer system with single-threaded disk interrupt processing will process the request packets sequentially on a first-come first-served basis. Thus, the request packets illustrated in FIG. 1 would be processed sequentially, with the first software application program receiving data read in the first request packet 1 and the second request packet 2. Following the data transfers associated with the first and second request packets 1 and 2, the second application software program would receive the data read from the second disk drive resulting from the third request packet 3. The first application software program would subsequently receive a third set of data associated with the fourth request packet 4. The disadvantage of this system is that application programs accessing different disk drives must still wait for the request packets to be sequentially processed due to the limitation of the single-threaded disk interrupt processing.

In a preferred embodiment of the present invention, two disk drives may be incorporated into a single computer and multithreaded interrupt processing is permissible for the two disk drives. In one embodiment, the computer is capable of operation with conventional operating systems and is transparent to the conventional operating systems. Disk commands from the operating system are accepted and the appropriate sequence commands to the two disk drives are generated such that the operating system believes only a single disk drive is present. This concept will be explained in greater detail below.

In an alternative embodiment, the operating system software can attach identification data to each request packet. The disk driver interprets the identification data and determines whether requests are for independent drives. If request packets are for independent disk drives, the disk driver can process the request packets in a non-sequential manner so as to maximize the utilization of the disk drives. In this embodiment, the independent utilization of two disk drives requires interaction with the operating system, but is transparent to the application software programs.

In yet another alternative embodiment, both the operating system program and the software application programs are designed to fully utilize the independent operation of the first and second disk drives using the multithreaded interrupt processing. If both the operating system and the software application program were designed to take advantage of multithreaded interrupt processing, there is a greater efficiency of disk utilization than is currently available in a system with singe-threaded interrupt processing.

The present description provides examples for interrupt processing when reading data stored on hard disk drives. Similar interrupt processing occurs for write operations when storing data on disk drives. However, the actual data processing are slightly different for read and write operations. In the interest of clarity, those differences will be briefly described. When performing a read operation, the disk drive receives a read command as well as additional data indicating the physical location of data on the disk drive. The disk drive positions the read/write head at the appropriate physical location and reads data until an internal buffer in the disk drive is full. At that point, the disk drive interface generates an interrupt to indicate that it is ready to transfer data to the processor. In contrast, when writing data to the disk drive, the processor fills the internal buffer on the disk drive with data to be stored on the disk drive and issues a write command, as well as data indicating the physical location on the disk drive where data will be stored. In response to the write command, the disk drive positions the read/write head at the appropriate location and stores the data contained within the internal buffer. When the internal buffer is empty, the disk drive interface generates an interrupt, thus indicating that it has completed the task and is prepared to receive additional data. Thus, the disk drive interface generates an interrupt during a read operation when the internal buffer in the disk is full, while the disk drive interface generates an interrupt during a write operation to indicate that the internal buffer is empty. The present invention is directed to multithreaded interrupt processing, and may apply to both read and write operations.

Two application programs can access data files located on the separate disk drives so that both drives are simultaneously active. While one application program may be accessing the first disk drive, a second application program can access the second disk drive thus increasing overall efficiency of the computer. It should be noted that it is not possible to simultaneously transfer data to two disk drives with the preferred embodiment of the present invention, but that the two disk drives may still be active simultaneously with data being transferred to one disk drive while the second disk drive is preparing for a data transfer.

For the simultaneous activation of two disk drives to be effective, it is necessary for a new multithreaded interrupt processing system so that the computer may determine which of the two active disk drives has generated an interrupt. One embodiment of the present invention is embodied in a system 100 illustrated in the functional block diagram of FIG. 2. The system 100 is incorporated into a computer that includes a central processing unit 102, such as an Intel Pentium® microprocessor. The system 100 also includes a random access memory (RAM) 104, and a read-only memory (ROM) containing computer instructions known as a basic input-output system (BIOS) 106. The BIOS 106 is used to initialize the CPU 102 and various input-output devices. During initializing of the computer containing the system 100, the contents of the BIOS 106 are copied to the RAM 104 to permit faster access to the computer instructions in the BIOS. However, for the sake of clarity, those instructions are referred to herein as BIOS instructions whether they are executed from the read-only memory BIOS 106 or the RAM 104. As is known in the art, the BIOS instructions are executed by the CPU 102 to control the transfer of data to and from disk drives. Thus, the disk related instructions in the BIOS 106 form a low level device driver to control the disk drives.

Figure 2:
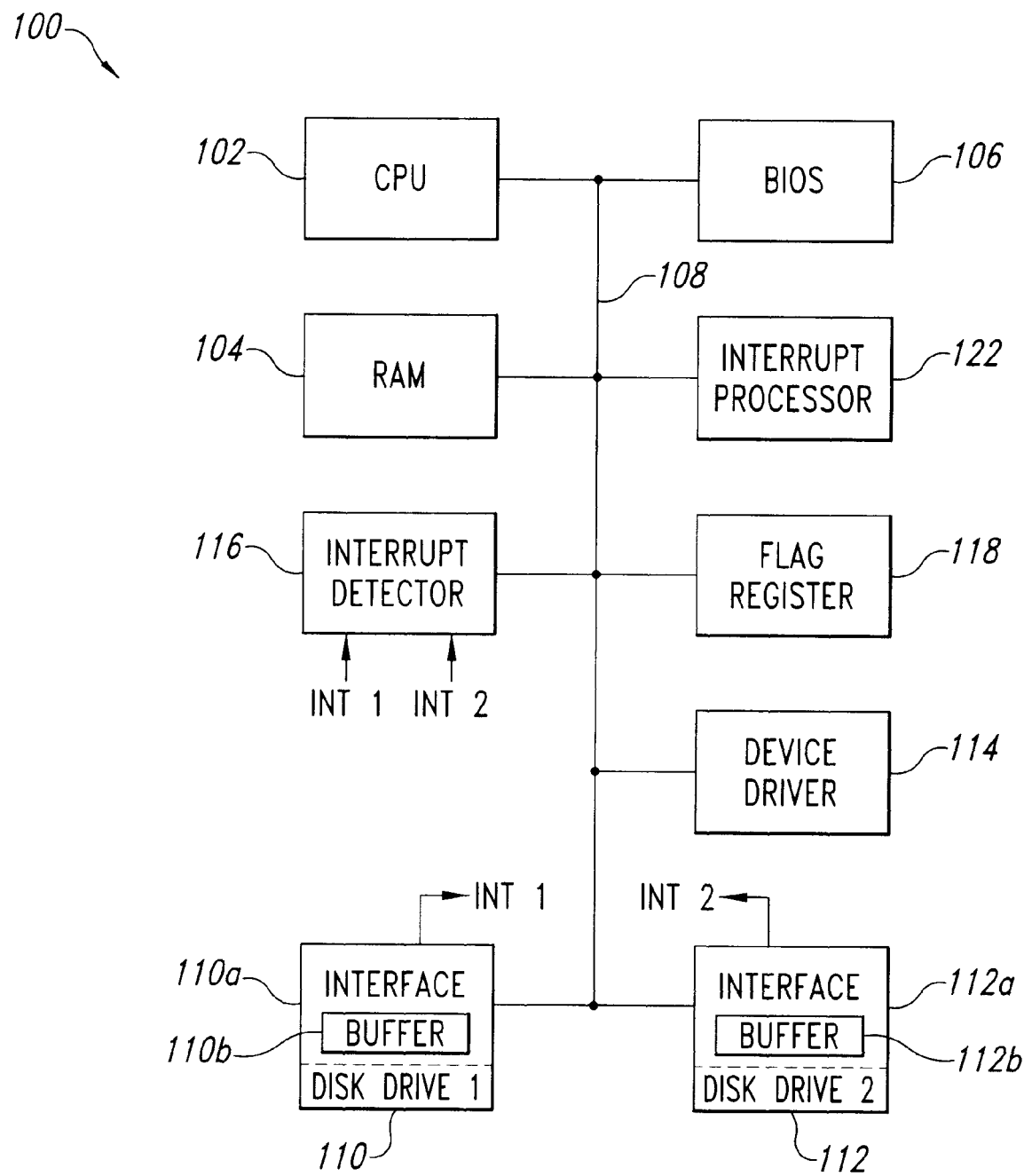
FIG. 2 is a functional block diagram of one embodiment the system of the present invention.

The various components of the system 100 are coupled together by a bus system 108, which may carry power, status and control signals in addition to data and addresses. The bus system 108 may consist of a single bus or several busses interconnected by bus bridges (not shown). However, for the sake of brevity and clarity, the bus system 108 is represented in FIG. 2 by a single bus system. Also for the sake of simplicity, other conventional components, such as a power supply, mouse, keyboard, display, etc., are not shown in FIG. 2. As is known in the art, the BIOS 106 also contains instructions that are executed by the CPU 102 to control communications with input-output devices such as the keyboard and display.

The system 100 also includes a first disk drive 110 and its associated disk drive interface 110a, including an internal buffer 110b. The system 100 also includes a second disk drive 112, and its associated interface 112a, including an internal buffer 112b. Several different disk drives may be used in a conventional PC, and will operate satisfactorily with the system 100. For example, the first and second disk drives 110 and 112 may be integrated device electronics (IDE) disk drives wherein the disk drive itself contains many of the required interface components. With IDE disk drives, a single interface coupled to the bus system 108 is capable of operating multiple IDE disk drives. However, the system 100 will operate satisfactorily with disk drives of other types, such as a small computer system interface (SCSI) disk drive. In addition, the system 100 may incorporate more than two disk drives. While the examples presented herein are directed to a two disk drive system, and multithreaded interrupt processing for two disk drives, principles of the present invention may be readily extended to three or more disk drives.

A disk transfer is initiated when an application software program issues a disk command, such as a read or write command. A device driver 114, which is typically part of the operating system, allows the CPU 102 to communicate with the first and second disk drives 110 and 112. A device driver is known in the art as a software component that permits a computer system to communicate with a peripheral device. The device driver translates data into a form understood by the device. The device driver may also manipulate the hardware associated with the peripheral. However, high-level drivers may only perform data translation and rely on a lower-level driver to send data to the device.

In the example illustrated herein, the device driver 114 is considered to be a high-level driver that translates data for communications between the computer and the first and second disk drives 110 and 112. The BIOS 106 acts as a low-level driver and translates the command from the operating system or driver to generate data to select a cylinder, head, address, and the like on the selected disk drive. In response to this data, the selected disk drive will prepare for a data transfer by positioning the read/write head (not shown) at the selected physical location on the disk drive and reading data into the internal buffer. The first disk drive 110 and second disk drive 112 will each generate an interrupt, INT1 and INT2, respectively, upon completion of the disk command.

Figure 3:
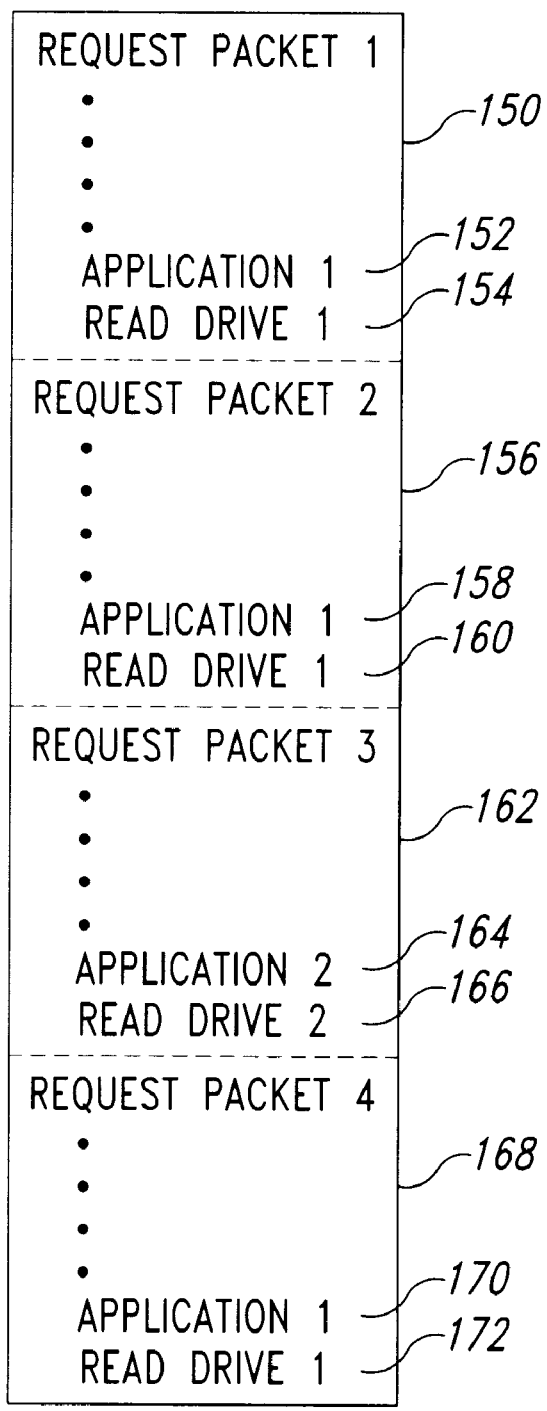
FIG. 3 is a schematic drawing which illustrates disk request processing by the system of FIG. 2.

As discussed above, the operating system generates data request packets in a queue to control data transfer between the computer and the disk drive or drives (see FIG. 1). The conventional operating system inherently knows which application software program is associated with each data packet request because the data packet requests are sequentially processed, and only one data request packet is active at any given time. In contrast, the operating system using the system 100 generates data request packets with additional data indicating the source of the data transfer request, as illustrated in FIG. 3. Each data request packet identifies the source of the disk data transfer request. For example, a first data request packet 150 includes a source identification data element 152 indicating that a first application software program has requested a disk data transfer. A transfer command 154 indicates that the first data request packet 150 is a request to read the data from the first disk drive 110 (see FIG. 2). Thus, the data packet has an identification data element indicating the source of the data transfer request and the disk drive associated with the request.

Similarly, each of the data request packets generated by the system 100 include identification elements. In the example of FIG. 3, a second data request packet 156 includes source identification data element 158 indicating that the data request has been generated by the first application software program and a disk transfer command 160 indicating that the data request by the first application software program is a request to read data from the first disk drive 110 (see FIG. 2). A third data request packet 162 includes source identification data element 164 indicating that a data transfer request has been made by a second software application program. A data transfer command 166 indicates that the request by the second application software program is a request to read data from the second disk drive 112. A fourth data request packet 168 includes source identification data element 170 indicating that the first application software program has made a data transfer request. A data transfer command 172 indicates that the data transfer request made by the first application software program is a request to read data from the first disk drive 110. Thus, each data request packet assembled by the operating system includes an identification data element indicating the source of the data transfer request and a data transfer command.

With reference to FIG. 2, the device driver 114 interprets the request data packets generated by the operating system. While the conventional operating system processes data request packets sequentially on a first-come first-served basis, this is unnecessary with the system 100. The device driver 114 analyzes the data request packets to determine whether the data request packets include data transfer requests to both the first disk drive 110 and the second disk drive 112. In the example illustrated in FIG. 3, the first data request packet 150, the second request data packet 156, and the fourth data request packet 168 are all data transfer requests from the first application software program to read data from the first disk drive 110. However, the third data request packet 162 is a request from the second application software program to read data from the second disk drive 112. While processing the first data processing packet 160, which involves the first disk drive 110, the device driver 114 analyzes the pending data request packets to determine whether any data requests are associated with the second disk drive 112. The second data request packet 156 is also a data transfer request for the first disk drive. Thus, the device driver 114 cannot process the second data request packet since the first disk drive is already active as a result of the device driver processing the first data request packet 150. Similarly, the fourth data request packet 168 cannot be processed by the device driver 114 because the device driver is already processing the first data packet 115 for data transfer request with the first disk drive. However, the third data request packet 162 can be processed by the device driver 114 because the data transfer command 166 identifies the third data request packet as associated with the second disk drive 112. Thus, the device driver 114 will simultaneously process the first data request packet 150 and the third data request packet 162. The identification data element identifying the source of the data transfer request may be implied if only one software program is being executed by the CPU 102. However, the device driver 114 must still determine that data transfer requests are being made to the two disk drives. Thus, the device driver 114 can process data request packets out of sequence so that the first disk drive 110 and the second disk drive 112 are simultaneously active.

When the first disk drive 110 executes the data transfer command 154 associated with the first data request packet 150, it will generate the interrupt INT1. Similarly, the disk drive 112 generates the second interrupt INT2 upon completion of the disk transfer command 166 associated with the third data request packet 162.

The system 100 includes an interrupt detector 116, which detects interrupts INT1 and INT2 from the first and second disk drives 110 and 112, respectively. The interrupt detector 116, which is sometimes called an interrupt handler, detects the generation of the interrupt and sets data bits in a flag register 118. The flag register 118 may be part of the memory 104, an internal register within the CPU 102 or other suitable storage location. Unlike the flag registers of the prior art, which contain data for the single active disk thread, the flag register 118 of the present invention contains data indicating the status of both the first and second disk drives 110 and 112. Two bits in the flag register 118 are encoded, as shown below in Table 1, to indicate the current status of both the first and second disk drives 110 and 112.

TABLE 1

| Flag Register (Hex) | Status |
| --- | --- |
| 00 | No Interrupt |
| 01 | Drive 1 Interrupt |
| 02 | Drive 2 Interrupt |
| 03 | Drive 1 and Drive 2 Interrupts |

When the interrupt detector 116 detects an interrupt from the first disk drive 110 or the second disk drive 112, it sets the data bits in the flag register to the appropriate value, as indicated in Table 1. In addition to individual interrupts from the first disk drive 110 and the second disk drive 112, it is possible that both disk drives may generate an interrupt before the CPU 102 can process the interrupts. In this case, the interrupt detector sets the bits in the flag register to 03H. The interrupt detector 116 also resets the interrupt bit in the disk drive interface 110a or 112a that generated the interrupt.

If the system 100 is controlled by a single task operating system, such as MS-DOS®, it can process an interrupt and transfer data immediately upon detection of the interrupt. The system 100 still provides an advantage in a single tasking operating system because the data identification element permits commands to be issued to the first disk drive 110 and the second disk drive 112 such that both disk drives are active simultaneously. Thus, the system 100 advantageously allows simultaneous disk operations such as a data transfer to the first disk drive 110 while the second disk drive 112 is preparing for a data transfer by locating a selected position on the disk.

As discussed above, so called multitasking operating systems use a form of time-division multiplexing by the CPU 102 so that it appears that multiple processes or threads are occurring simultaneously. When an interrupt occurs in a multitasking operating system, the CPU 102 may be performing a different process or thread and cannot drop the ongoing thread to process the interrupt, such as transferring data to the first disk drive 110 in a response to an interrupt therefrom. Therefore, the system 100 includes a technique to register the occurrence of an interrupt while minimizing the interference with the ongoing process being performed by the CPU 102. The interrupt detector 116 determines which of the first and second disk drives 110 and 112 generated the interrupt and sets the data bits and the flag register 118 in accordance with Table 1 above. The interrupt detector 116 also resets the interrupt and returns control of the CPU 102 to the process or thread that was temporarily interrupted. The CPU 102 is then permitted to complete the current thread, or at least reach a point where the current thread can be interrupted before processing the interrupt from the first disk drive 110 or the second disk drive 112. Thus, the interrupt detector 116 interrupts the current thread only long enough to determine which of the first and second disk drives 110 and 112 generated the interrupt, set the data bits in the flag register 118 accordingly, and reset the interrupt. As those skilled in the art will readily understand, this processing causes only a brief disruption of the current thread.

When the CPU 102 has completed the current thread, or reaches a point where the current thread can be interrupted, and is able to process the interrupt from the first disk drive 110 or second disk drive 112, control of the system 100 is turned over to an interrupt processor 122, which contains the actual code to process data and execute the desired command. For example, if the desired command is to read data from the first and second disk drives 110 and 112, the process performed by the interrupt processor 122 includes the code to actually read the data from the specified disk drive or disk drives. The system 100 can determine whether the first disk drive 110 or the second disk drive 112 generated the interrupt by virtue of the encoded data bits in the flag register 118. Thus, the system 100 advantageously allows the use of two hard disk drives and can perform multithreaded interrupt processing for the two disk drives. As a result, the two disk drives can both be active at the same time thus increasing data transfer efficiency.

It should be noted that several functions illustrated in the functional block diagram in FIG. 2, such as the device driver 114, the interrupt detector 116 and the interrupt processor 122 are primarily software instructions that are executed by the CPU 102. The instructions from the interrupt detector 116 and the interrupt processor 122 are typically part of the BIOS 106 and are stored within the memory 104 as previously discussed. However, for the sake of clarity, these functions are illustrated in FIG. 2 as separate functional blocks because each performs a distinct task.

It should also be noted that the identification data element, such as the first identification element 152 (see FIG. 3) can be used to control data transfers between the first disk drive 110 and the second disk drive 112 at a variety of different control points in the operating system. For example, some operating systems use an I/O manager that creates the data request packets and passes the data request packets to the device driver 114. For example, Windows NT® utilizes the I/O manager to determine whether the device driver 114 is processing an interrupt packet for either the first disk drive 110 or the second disk drive 112. In one embodiment of the system 100, the I/O manager can interpret the identification data element in each data request packet to determine whether it is possible to initiate disk transfers with both the first and second disk drives 110 and 112. For example, the I/O manager receives data requests from first and second software application programs and creates the data request packets illustrated in FIG. 3. As discussed above, each data request packet has an associated identification data element. The I/O manager uses the identification data element to determine whether both disk drives are currently active, and may pass one or more data request packets to the device driver 114 so that both the first and second disk drives 110 and 112 may be active simultaneously. In the example discussed above with respect to FIG. 3, the I/O manager transfers the first data request packet 150 to the device driver 114 for processing. The device driver 114 processes the first data request packet 150, thus activating the first disk drive 110. At the same time, the I/O manager analyzes additional identification data elements in the remaining data request packets and, based on the identification data element 164, determines that the third data request packet 162 has been made by a second software application program. The I/O manager thus transfers the third data request packet 162 to the device driver 114 for immediate processing such that the first and second disk drives 110 and 112 are now simultaneously active.

However, operating systems are also known that will enable the device driver 114 to initialize and manage its own queue of data request packets. Using the same format as that illustrated in FIG. 3, the device driver generates interrupt packets and uses the identification data elements to determine whether the device driver can process data request packets for the first disk drive 110 and the second disk drive 112 so that both the first and second disk drives are simultaneously active. Thus, those of skill in the art will recognize that many different software elements in an operating system can be used to monitor the utilization of the first and second disk drives 110 and 112 using the identification data elements in the manner described above. This software element, whether the I/O manager, the device driver 114, or some other portion of the operating system may be referred to generically herein as a software command module. It is the software command module that utilizes the identification data elements to determine whether data request packets are intended for independent disk drives, such as the first disk drive 110 and the second disk drive 112. While the example above is directed to the use of first and second disk drives 110 and 112 for first and second software application programs, respectively, those of skill in the art will also recognize that the system 110 can be utilized for any independent data transfer requests with the first and second disk drives 110 and 112. For example, a single software application program may have a first type of data, such as video data stored in a data file on the first disk drive 110, and audio data stored in a data file on the second disk drive 112. The single software application program may make two independent data transfer requests for video and audio data, respectively. The software control module will detect, using the identification data elements, that the data transfer requests from the single software program are independent software requests for the first and second disk drives 110 and 112, respectively. With this information, the software control module will generate the appropriate request packets for transfer to the device driver 114 so that both the first and second disk drives 110 and 112 may be simultaneously active.

Because the CPU 102 may be performing a different thread at the time an interrupt occurs, it is desirable that the software code executed by the interrupt detector 116 be as short as possible. Therefore, the steps performed by the interrupt detector 116 merely set the data bits in the flag register 118, clear the interrupt in the interface that generated the interrupt, and return to the interrupted thread.

While those of ordinary skill in the art readily understand the processes performed by the operating system to transfer data to or from a disk drive, these processes will be discussed briefly. The operating system, such as Microsoft Windows®, uses a file allocation table (FAT) to determine the location of a data file on the disk drive. The FAT itself is another data file stored on the disk drive and tracks the usage of the disk drive. Thus, the FAT is a form of directory that tracks locations of data files and the location of free or unused portions of the disk drive. When the operating system transfers a file to the disk drive, it uses the FAT to determine a suitable physical location on the disk at which to store the file. It should be noted that the data file may be broken into different blocks if a contiguous block of space is not available on the disk drive. Similarly, when the operating system reads a data file from the disk drive, it uses the FAT to determine the physical location of the data file on the disk drive. Once the operating system has determined the physical location of the data file using the FAT, this data is accessed by the device driver 114 or BIOS 106 which places commands in the internal registers of the disk drive interface. The data in these registers cause the disk drive to position the read/write head at the appropriate physical location on the disk drive and read data into the internal buffer.

If the system 100 is operating with two application programs accessing data files located on separate disk drives, the operating system is aware of two separate physical disk drives, each containing an independent FAT to determine the physical location of data files on each respective disk drive. The advantage of this implementation is that each software application program can independently access its own disk drive, thus allowing both the first disk drive 110 and the second disk drive 112 to be simultaneously active. It should be noted that the application programs themselves need not be on separate disk drives. It is only necessary that the application programs access separate disk drives so that both the first disk drive 110 and the second disk drive 112 can be simultaneously active.

Figure 4:
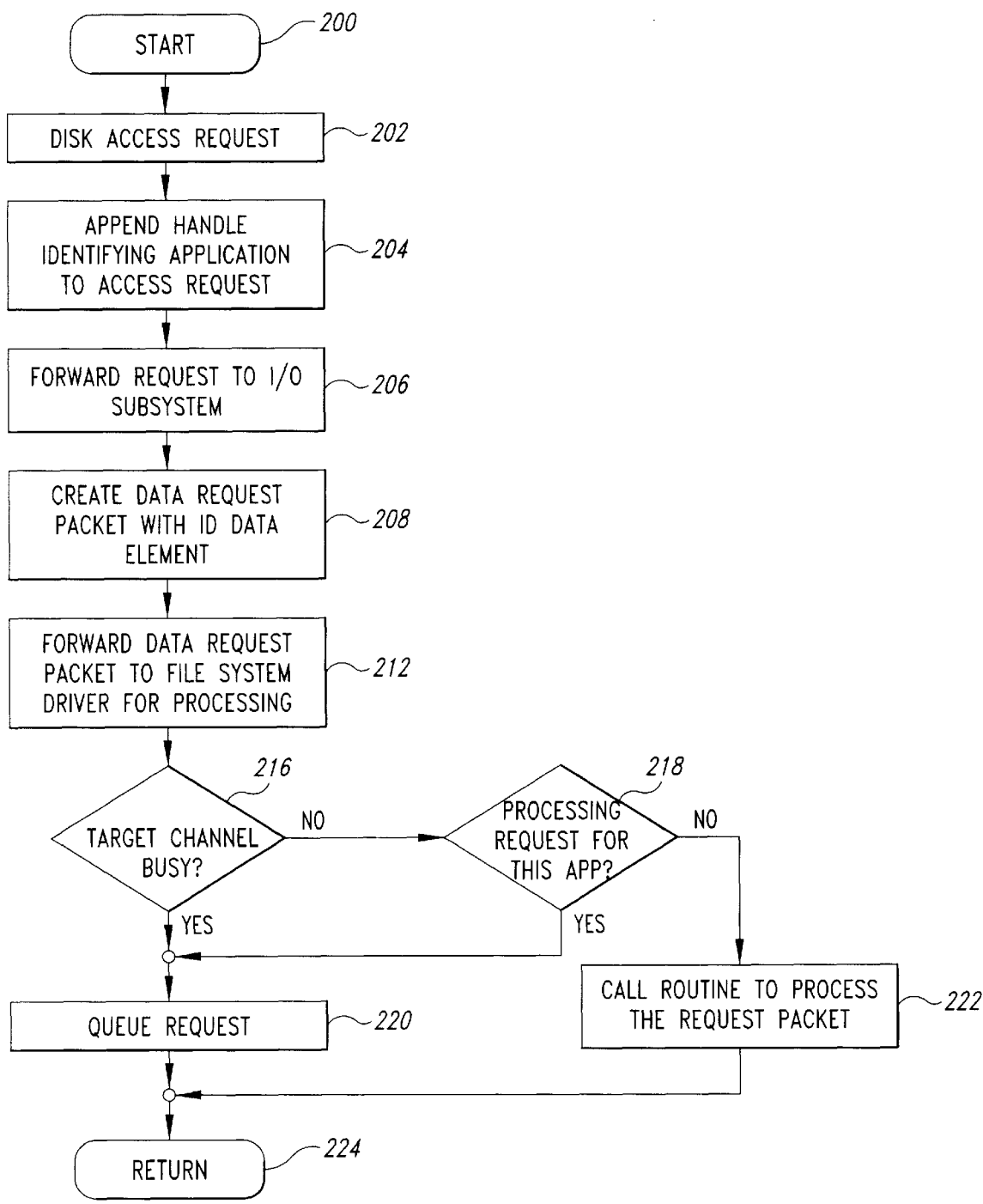
FIGS. 4A and 4B together are a flowchart of the operation of the system of FIG. 2 for activating multiple disk drives.

The software executed by the CPU 102 to control the operation of the system of FIG. 2 to access multiple disk drives is illustrated in the flowcharts of FIGS. 4A and 4B. At a start 200, shown in FIG. 4A, the operating system is executing one or more application software programs. In step 202, a software program generates a disk access request, such as a request to read data from the first disk drive 110. In step 204, the operating system modifies the access request by appending to it a handle identifying the application making the request. In step 206, the request is forwarded to an I/O subsystem. It should be noted that the operation of software components, such as the I/O subsystem, I/O manager, device driver, and the like, are well known to those of ordinary skill in the art and will only be discussed as related to the identification data element appended to disk access requests. In step 208, the I/O subsystem generates a data request packet, such as illustrated in FIG. 3, including an identification data element indicating which software application made the request for disk access. In step 212, the I/O subsystem forwards the data request, with identification data element, to a file system driver (FSD) for further processing. The FSD calls the appropriate I/O support routines and initializes I/O stack locations in the data request packet accordingly. As previously discussed, in a conventional FSD, the device driver may rely on the I/O manager to queue all data request packets while the device driver is processing an earlier data request packet. The device driver will process each data request packet sequentially in the order in which the requests were received by the operating system. In contrast, the system 100 relies on the device driver 114 to handle the queuing of data request packets. As described above, the device driver can determine from the data identification element whether or not a particular data request packet may be processed concurrently with a data request packet currently being processed. Alternatively, the FSD or I/O manager may also analyze the identification data element and pass data request packets to the device driver 114 for concurrent processing along with a data request packet currently being processed by the device driver. As noted above, the software component that determines the ability of the device driver 114 to process concurrent data request packets is referred to herein as the software control module. The software module may be part of the device driver 114 (see FIG. 2), the BIOS 106, or components of the operating system such as the FSD or I/O manager. The process performed by the software control module is illustrated in FIG. 4B where, in decision 216, the software control module determines whether the target channel is busy. As discussed above, the system 100 is incapable of actually transferring data simultaneously from both the first and second disk drives 110 and 112. Thus, if one disk drive is actually processing a command such as a data transfer command or responding to a seek command, the target channel is busy. In that event, the result of decision 216 is YES. If the target channel is busy, the system 100 places the data request packet in a queue in step 220 for subsequent processing by the software control module. If the target channel is not busy, the result of decision 216 is NO. In that event, in decision 218, the software control module uses the identification data element to determine whether the CPU 102 is currently processing a data access request for the same application. If the CPU is processing a request for the same application, the result of decision 218 is YES. In that event, the data request packet is queued in step 220, as described above. If the CPU is not currently processing a request for the same application, the result of decision 218 is NO. In that event, the system calls the appropriate I/O routines to process the request packet in step 222. Under this condition, the system 100 is simultaneously processing a data request packet for each of the first and second disk drives 110 and 112. Following the placement of a data request packet in the queue, in step 220, or the processing of a data request packet in step 222, in step 224, the system 100 returns control of the CPU 102 to a previously executing thread.

Figure 5A:
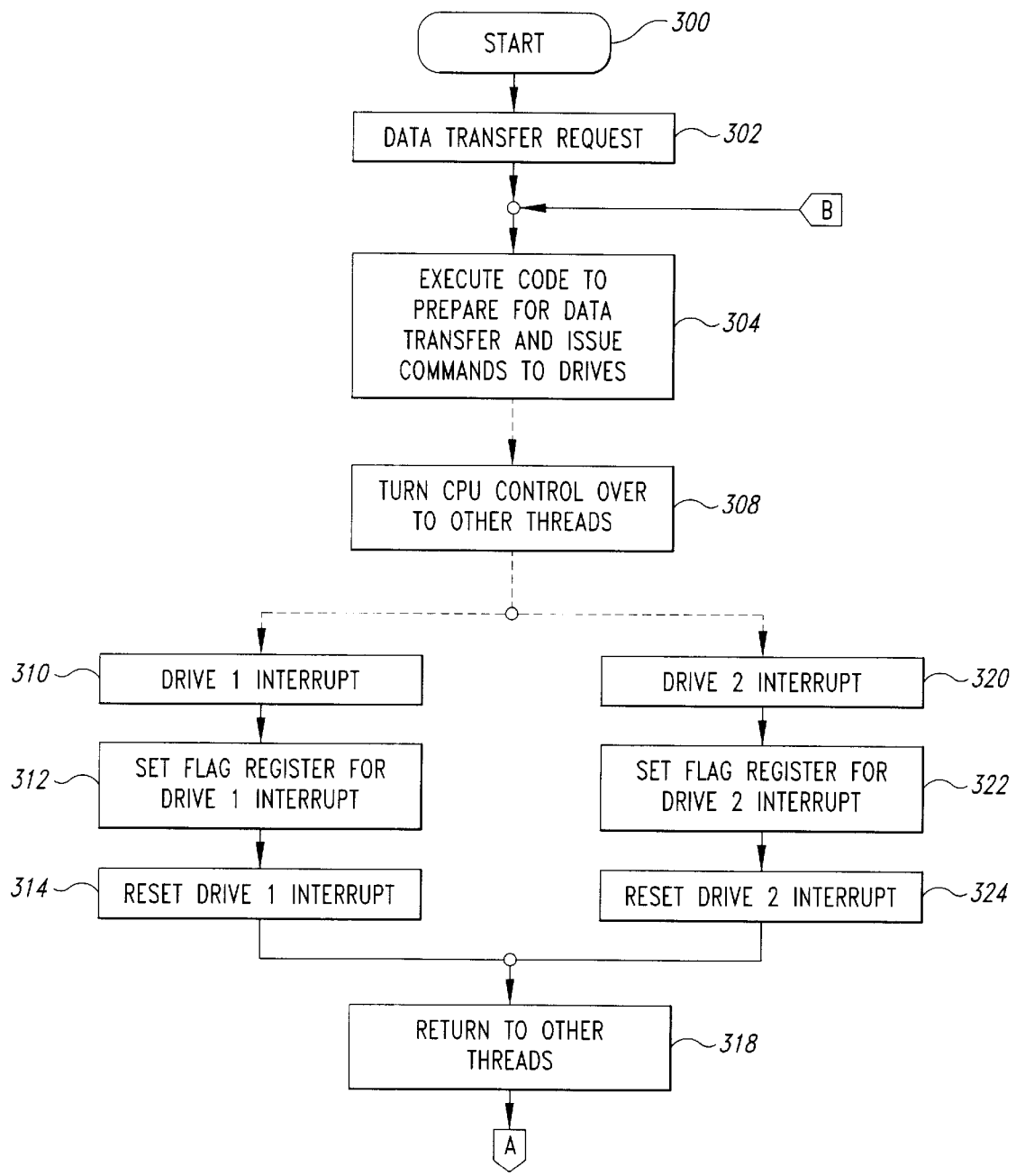
FIGS. 5A and 5B together are a flowchart of the operation of the system of FIG. 2 for processing interrupts from multiple active disk drives.
Figure 5B:
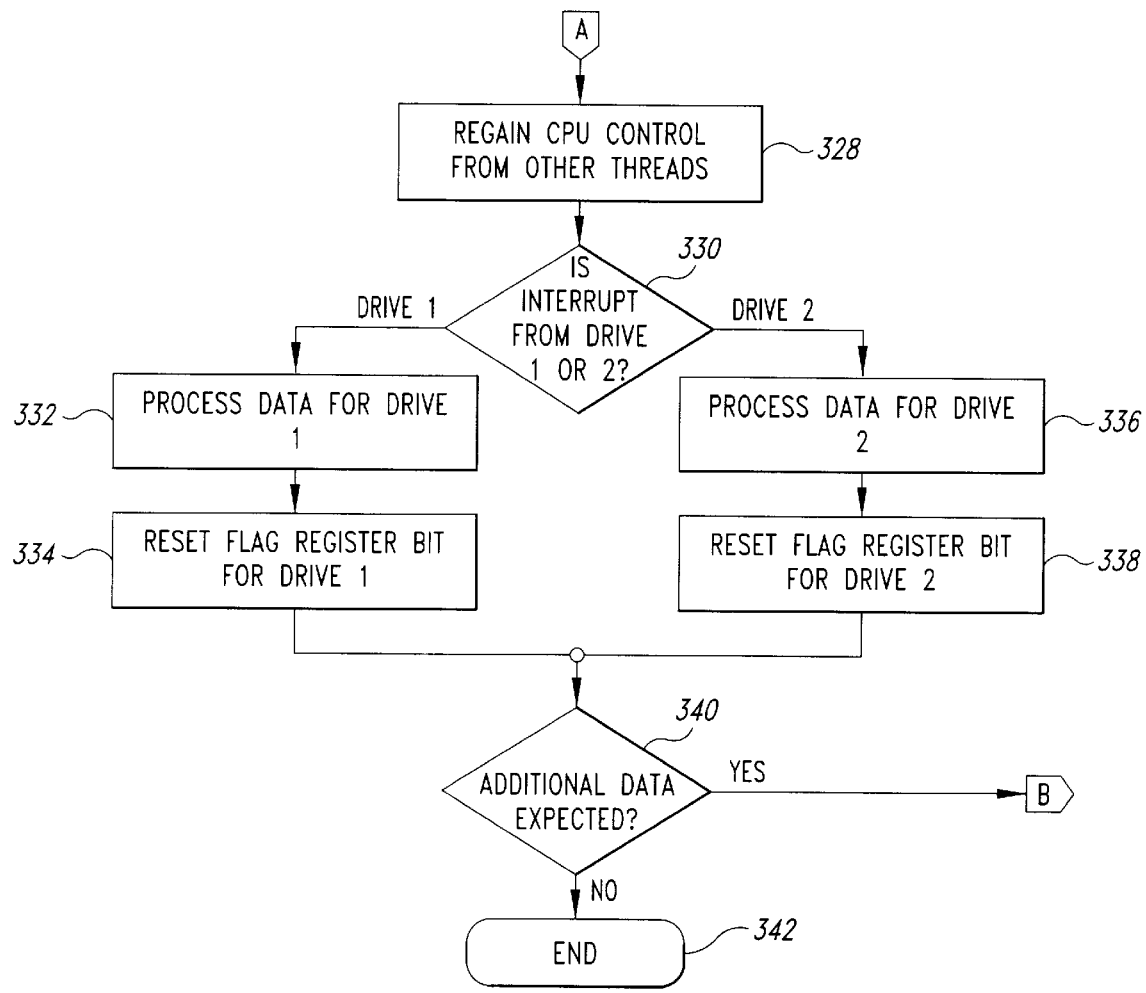

If both the first disk drive 110 and the second disk drive 112 are simultaneously active, the system must be able to determine which of the disk drives generated an interrupt. The operation of the system of FIG. 2 for processing multiple interrupts is illustrated in the flowcharts of FIGS. 5A and 5B. At a start 300, shown in FIG. 5A, the system 100 wishes to make a data transfer. It should be noted that the term data transfer is intended to encompass both reading data from the first and second disk drives 110 and 112 or writing data to the first and second disk drives. As previously discussed, the examples presented herein are directed to a read operation where data is transferred from the first disk drive 110 and the second disk drive 112 to the CPU 102. However, disk write operations are processed in a similar fashion. In step 302, the system makes a data transfer request, such as, for example, a data read operation. In step 304, the CPU 102 executes the code to prepare for the data transfer and issues a command to the first disk drive 110. As discussed above, the operating system uses the FAT to determine the physical location of an existing data file on the first disk drive 110 and the second disk drive 112. Similarly, the operating system uses the FAT to determine a location on the first disk drive 110 and the second disk drive 112 at which to store a data file when transferring data to the first and second disk drives. As noted above, the operating system uses a separate FAT for the first disk drive 110 and the second disk drive 112 if the system 100 is used with application programs accessing data files on the separate disk drives.

The BIOS 106 contains instructions, which the CPU 102 executes, to transfer data or commands to the internal registers of the first disk drive 110. For example, the disk transfer command to the first disk drive 110 will include data such as the physical location on the first disk drive from which the data file will be read. The BIOS 106 also contains instructions to issue commands to the second disk drive 112 in preparation for a data transfer with the second disk drive. As discussed above, in the disk striping embodiment of the system 100, a data file is apportioned into blocks that are alternately stored on the first disk drive 110 and the second disk drive 112. The system 100 advantageously allows the BIOS 106 to issue commands to both the first disk drive 110 and the second disk drive 112 to allow each of the first and second disk drives to simultaneously perform the time consuming task of positioning the read/write head at the proper location on the disk drive. As previously discussed, prior art systems do not permit such simultaneous instructions, since the prior art system has no way of determining which disk drives generated an interrupt.

While the first disk drive 110 and the second disk drive 112 are responding to the commands provided in step 304, the system 100 may turn control of the CPU 102 over to other operating system threads in step 308. As previously discussed, even in a multithreaded operating system, such as Windows®, the CPU 102 can only execute instructions for one thread at a time. However, while the first disk drive 110 and the second disk drive 112 are responding to the commands from step 304, the CPU 102 can execute other threads, giving the appearance of a multithreaded system. Thus, in step 308, the CPU 102 is used to control other threads that are typically unrelated to the first and second disk drives 110 and 112. If the system 100 is operating with two independent software application programs, one thread being processed by the CPU 102 may be the first software application program accessing, for example, the first disk drive 110. When control of the CPU 102 is turned over to other processes in step 308, those "other processes" may include the second independent software application program, which may issue a data transfer command to the second disk drive 112 regardless of the fact that the first disk drive 110 is already active. Thus, even with two independent software application programs, the system 100 allows the first disk drive 110 and the second disk drive 112 to be simultaneously active.

At some point in time, either the first disk drive 110 or the second disk drive 112 will generate an interrupt. If the BIOS 106 sequentially issued commands to the first disk drive 110 and the second disk drive 112, the first disk drive would generally be the first to generate the interrupt. However, this may not always be the case. For example, the read/write head of the second disk drive 112 may be closer to the physical location specified by the operating system using the FAT. Therefore, it is conceivable that the second disk drive interface 112a will generate an interrupt first, even though it was issued commands following the commands issued to the first disk drive 110. Furthermore, as illustrated in Table 1, it is possible that interrupts may be generated by both the first disk drive 110 and the second disk drive 112 while the CPU 102 is processing a different thread. However, the system 100 is capable of processing interrupts from either the first disk drive 110, the second disk drive 112, or both disk drives regardless of the sequence in which the commands were issued to the disk drives and regardless of which disk drive generates the first interrupt.

As discussed above, the system 100 can determine which of the first and second disk drives 110 and 112 generated an interrupt by virtue of the data in the flag register 118 (see FIG. 2). If the first disk drive 110 is prepared for a data transfer, the first disk drive interface 110a generates an interrupt in step 310. In step 312, the interrupt detector 116 (see FIG. 2) detects the interrupt from the first disk drive 110 and sets the data in the flag register 118 to indicate an interrupt from the first disk drive. In step 314, the interrupt detector 116 resets the interrupt in the first disk drive interface 110a. It should be noted that the interrupt from the first disk drive 110 can occur at any point in time after it has received disk transfer commands. If the CPU 102 is executing a different thread that cannot be readily interrupted, it must allow the different thread to proceed to a point where it can be interrupted before returning control to the interrupt processor 122. Therefore, the code within the interrupt detector 116 and executed by the CPU 102 is extremely short and includes only steps 312 and 314. The short length of code executed by the interrupt detector 116 minimizes disruption of the CPU 102 while executing other threads. In step 318, the interrupt detector 116 returns control of the CPU to the other on-going thread.

When the second disk drive 112 is prepared for a data transfer, the second disk drive interface 112a issues an interrupt in step 320. The interrupt detector 116 detects the interrupt from the second disk drive 112 and, in step 322, sets the data in the flag register 118 to indicate that the second disk drive 112 has generated an interrupt. In step 324, the interrupt detector 116 resets the interrupt in the second disk drive interface 112a. The interrupt detector 116 then performs steps 322 and 324 as discussed above with respect to steps 312 and 314. Following the reset of the interrupt in the second disk drive interface 112a in step 324, the system 100, in step 318, returns control of the CPU 102 to the other on-going threads that may have been executing at the time the interrupt from the second disk drive 112 was generated.

When the CPU 102 has completed execution of the other on-going thread to a point where it can be interrupted, the system 100 regains CPU control from those other threads in step 328 shown in FIG. 5B. In step 330, the system 100 determines whether the interrupt is from the first disk drive 110 or the second disk drive 112. As discussed above, this may be readily ascertained by an analysis of the contents of the flag register 118. If the flag register 118 contains a value of 03H indicating that both disk drives generated interrupts, step 330 also includes determining the sequence in which the first and second interrupts will be processed. This sequence determination sequence will be described in detail below.

If the interrupt was from the first disk drive 110, the system 100, in step 332, processes the data for the first disk drive. As discussed above, this processing will include either reading data from the first disk drive 110 or writing data to the first disk drive. Following the data processing in step 332, the system 100, in step 334, resets the data bit in the flag register that corresponds to the interrupt status for the first disk drive 110. If the interrupt was from the second disk drive 112, the system 100, in step 336, processes data for the second disk drive. Again, the data processing can include either reading data from the second disk drive 112 or writing data to the second disk drive. Following the processing of data for the second disk drive 112 in step 336, the system 100, in step 338, resets the data bit in the flag register that corresponds to the interrupt status for the second disk drive.

If the data in the flag register 118 is 03H, indicating that the first disk drive 110 and the second disk drive 112 both require interrupt processing, decision 330 must determine which interrupt to process first. There are several alternative techniques to determine which interrupt to process first. In one alternative, the system 100 processes the interrupt from the disk drive to which a command was first issued. For example, in the dual independent software application program embodiment of the system 100, the interrupt from the disk drive that first received data transfer commands from the CPU 102 is processed first. If the first software application program issued a data transfer command to the first disk drive 110 prior to the point in time where the second software application program issued a data transfer command to the second disk drive 112, the system 100 will process the interrupt from the first disk drive 110 before processing the interrupt from the second disk drive 112. Similarly, if the second software application program issued a data transfer command to the second disk drive 112 prior to the point in time where the first software application program issued a data transfer command to the first disk drive 110, the system 100 will process the interrupt for the second disk drive before processing the interrupt for the first disk drive.

In a second alternative technique for processing simultaneous interrupts, the two software application programs may be assigned priorities such that one software application program may operate essentially as a foreground task with a higher priority, while the other software application program operates as a background task with a lower priority. In this alternative, the system 100 will first process the interrupt from the disk drive associated with the higher priority task and then process the interrupt from the disk drive associated with the lower priority task.

It should be noted that the sequence of interrupt processing is irrelevant with the disk striping embodiment of the system 100. As previously discussed, disk striping involves the apportionment of data files into blocks that are alternatively stored on the first disk drive 110 and the second disk drive 112. If the data transfer command is a read command, the operating system allocates a portion of the RAM 104 (see FIG. 2) to receive the various blocks of data. The first block of data, which may be from the first disk drive 110, by way of example, will be stored in a corresponding first block of the RAM 104. The second block of data, which is stored on the second disk drive 112 in the present example, will be read into a second corresponding block of the RAM 104. As is well known to those of ordinary skill in the art, memory access times for the RAM 104 are identical for the first and second corresponding blocks, which will receive blocks of data from the first disk drive 110 and the second disk drive 112, respectively. The processing time to transfer the first block of data from the first disk drive 110 to the RAM 104 is virtually identical to the processing time to transfer the second block of data from the second disk drive 112 to the RAM. Therefore, if the data in the flag register is 03H, the interrupt processor 122 (see FIG. 2) can process either interrupt without regard to the sequence in which the interrupts were generated by the disk drives or the sequence in which data transfer commands were issued to the disk drives. However, in the presently preferred embodiment, the system 100 processes the interrupt from the disk drive which was the first to receive a data transfer command.

Following the reset of the data bits in the flag register 118 in step 334 or step 338, the system 100 moves to step 340. In step 340, the system determines whether additional data is expected. As is known to those of ordinary skill in the art, there is a maximum number of data blocks or sectors that can be transferred to or from a disk drive in a single interrupt. If a data file exceeds this maximum number, the data file must be transferred using more than one interrupt. In a presently preferred embodiment, it has been determined that disk striping works effectively with a maximum transfer size of 16 sectors, where one sector is defined as 512 bytes. However, the present invention is not limited by the maximum data transfer size. For example, disk drives with a larger internal buffer may be able to transfer more than 16 sectors of data. If the data to be transferred is larger than 16 sectors, the system 100 will read the first 16 sectors from one disk drive and will expect an additional interrupt to transfer additional sectors. With the disk striping implementation of the system 100 previously described, the first 16 sectors are transferred to or from one disk drive, such as the first disk drive 110, with the next 16 sectors being transferred to or from the second disk drive 112. If additional data transfers are required, the next 16 sectors would be to or from the first disk drive 110. This process is repeated with data transfers alternating between the first disk drive 110 and the second disk drive 112. The advantage of the system 100 is that both the first and second disk drives 110 and 112 can be responding to commands that overlap in time thus reducing disk access time and increasing the efficiency of the system 100.

As is known to those of ordinary skill in the art, the operating system provides an indication of the size of the data to be transferred to or from the disk drive. Therefore, the system 100 is able to determine whether multiple interrupts will be required to complete a data transfer 16 sectors at a time. If additional data is not expected, the result of decision 340 is NO. In that event, the system 100 ends the disk transfer process at 342. If additional data transfers are expected, the result of decision 340 is YES. In that event, the system 100 returns to step 304, shown in FIG. 5A, where additional commands are issued to the first disk drive 110 and the second disk drive 112 in preparation for the additional data transfers.

Tests have indicated that the inventive disk striping technique provides approximately a 10% improvement in efficiency of data transfers to and from the first and second disk drives 110 and 112. It should be noted that the system 100 achieves this improvement in efficiency by allowing the first disk drive 110 and the second disk drive 112 to be active simultaneously. While the flow charts of FIGS. 4A–4B and 5A–5B illustrate the inventive process, it should be noted that alternative procedures may be employed by the system 100. For example, step 204, in FIG. 4A, illustrates the operation of the system 100 to issue commands to both the first disk drive 110 and the second disk drive 112. However, the system 100 can issue commands to only one disk drive as well. For example, the system 100 may initially issue commands to both the first disk drive 110 and the second disk drive 112, as illustrated in step 304 (see FIG. 5A). Assuming that the first disk drive 110 generates an interrupt before the second disk drive 112, the system 100 will process data for the first disk drive 110 in step 332, shown in FIG. 5B. However, the system 100 may issue additional commands to the first disk drive 110 following the completion of step 332. In this manner, the first disk drive 110 will receive commands and prepare for an additional data transfer. Thus, while the system 100 responds to the interrupt from the second disk drive 112, and processes data for the second disk drive in step 336, the first disk drive 110 is simultaneously responding to additional commands so that it will be prepared to transfer data upon the completion of the data transfer with the second disk drive in step 338. In this manner, the system 100 can issue commands to the first disk drive 110, the second disk drive 112, and additional disk drives thus further improving disk transfer efficiency.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for simultaneous operation of multiple disk drives in a computer capable of executing first and second software programs, the system comprising:
   a first disk drive responsive to disk data transfer commands from the first software program, said first disk drive having a first interrupt generating circuit to generate a first interrupt signal upon completion of said disk data transfer commands from the first software program;
   a second disk drive responsive to disk data transfer commands from the second software program, said second disk drive having a second interrupt generating circuit to generate a second interrupt signal upon completion of said disk data transfer commands from the second software program;
   a software control module to control operation of said first and second disk drives, said control module receiving commands from the first and second programs and generating first and second disk commands in response thereto, said first disk command including a disk transfer command from the first software program and said second disk command including a disk transfer command from the second software program, said software control generating said second disk command while said first disk drive is processing said first disk command; and an identification data element indicating the first software program as a source software program associated with said first disk command and indicating the second software program as said source software program associated with said second disk command, said software control module using said identification data element to determine if said first and second disk drives are active and generating said second disk command while said first disk drive is processing said first disk command if said second disk drive is not active wherein a plurality of said disk transfer commands are contained within a corresponding plurality of data packets and said first disk drive command and said identification data element identifying the first application program as said source software program are contained within a first data packet and said second disk drive command and said identification data element identifying the second application program as said source software program are contained within a second data packet, said first and second data packets being non-consecutive data packets that are sequentially processed by said software control module.

2. A system for simultaneous operation of multiple disk drives in a computer having an operating system program and capable of executing a software application program, the system comprising:

a first disk drive accessible by the software application program, said first disk drive having a first interrupt generating circuit to generate a first interrupt signal;

a second disk drive accessible by the software application program, said second disk drive having a second interrupt generating circuit to generate a second interrupt signal;

a software control module to control operation of said first and second disk drives, said control module receiving disk-related commands from the operating system program and generating disk commands in response thereto; and an identification data element for each of said disk commands to indicate a disk drive associated with each of said disk commands, said software control element generating first and second disk commands to activate said first and second disk drives simultaneously if said identification data element indicates that two of said disk commands are associated with said first and second disk drives, respectively, wherein a first data packet indicating a first data transfer command is associated with the application program and said first disk drive and a second data packet indicating a second data transfer command is associated with the application program and said second disk drive, said first and second data packets being non-consecutive data packets that are sequentially processed by said control module.

* * * * *

UNITED STATES PATENT AND TRADEMARK OFFICE
CERTIFICATE OF CORRECTION

PATENT NO.    : 5,911,077
DATED         : June 8, 1999
INVENTOR(S)   : Eric D. Anderson It is certified that error appears in the above-identified patent and that said Letters Patent is hereby corrected as shown below:

Column 1,
Line 64, "associated the" -- associated with the --

Column 2,
Line 33, "of one embodiment the system" -- of the system --

Column 4,
Line 1, "In a preferred embodiment of the present invention"
-- In the present invention --.

Column 5,
Line 9, "One embodiment of the present invention" -- The present invention --

Title page,
Item [56], (5,237,466), "8/1993" change to -- 7/1993 --

Signed and Sealed this

Thirtieth Day of October, 2001

*Attest:*

NICHOLAS P. GODICI
*Attesting Officer*  *Acting Director of the United States Patent and Trademark Office*